US012566852B2

(12) United States Patent
Solomon et al.

(10) Patent No.: US 12,566,852 B2
(45) Date of Patent: Mar. 3, 2026

(54) NEFARIOUS CODE DETECTION USING SEMANTIC UNDERSTANDING

(71) Applicant: Microsoft Technology Licensing, LLC, Redmond, WA (US)

(72) Inventors: Shane Douglas Solomon, Renton, WA (US); Christine Marie Difonzo, Lancaster, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 239 days.

(21) Appl. No.: 18/133,498

(22) Filed: Apr. 11, 2023

(65) Prior Publication Data

US 2024/0273200 A1     Aug. 15, 2024

Related U.S. Application Data

(60) Provisional application No. 63/444,627, filed on Feb. 10, 2023.

(51) Int. Cl.
 G06F 21/56     (2013.01)
 G06F 40/30     (2020.01)

(52) U.S. Cl.
 CPC ............ G06F 21/563 (2013.01); G06F 40/30 (2020.01); *G06F 2221/033* (2013.01)

(58) Field of Classification Search
 CPC ... G06F 21/563; G06F 40/30; G06F 2221/033
 USPC .......................................................... 726/1
 See application file for complete search history.

(56) References Cited

U.S. PATENT DOCUMENTS

| | | | | |
|---|---|---|---|---|
| 2018/0260472 | A1* | 9/2018 | Kelsey | .................... G06F 40/56 |
| 2018/0285740 | A1* | 10/2018 | Smyth | .................... G06N 3/084 |
| 2021/0216642 | A1* | 7/2021 | Barraza Enciso | ....... G06N 3/02 |
| 2022/0058449 | A1* | 2/2022 | Goodsitt | .................. G06N 5/01 |
| 2022/0083898 | A1* | 3/2022 | Shukla | .................. G06F 40/284 |

(Continued)

FOREIGN PATENT DOCUMENTS

| | | | | | |
|---|---|---|---|---|---|
| CN | 107688742 | A | * | 2/2018 | ............... G06T 7/12 |
| CN | 109670311 | A | * | 4/2019 | |

(Continued)

OTHER PUBLICATIONS

Dobreva et al., "MalDeWe: New Malware Website Detector Model based on Natural Language Processing using Balanced Dataset," Las Vegas, NV, USA, 2021, pp. 766-770, doi: 10.1109/CSCI54926. 2021.00043. (Year: 2021).*

(Continued)

*Primary Examiner* — Peter C Shaw
(74) *Attorney, Agent, or Firm* — Alleman Hall LLP

(57)     ABSTRACT

The disclosed technology is generally directed to nefarious code detection using semantic understanding. In one example of the technology, a natural-language output is generated by performing a natural-language translation of code. A machine-learning model is used to generate a confidence score that indicates a confidence that the natural-language output is potentially malicious. Based at least in part on whether the confidence score exceeds a first threshold, whether the natural-language output is potentially malicious is determined. Responsive to determining that the natural-language output potentially malicious, the code is flagged as potentially malicious.

16 Claims, 5 Drawing Sheets

100

(56) References Cited

U.S. PATENT DOCUMENTS

| | | | |
|---|---|---|---|
| 2022/0261241 A1* | 8/2022 | Balasubramanian ... | G06F 40/56 |
| 2022/0358214 A1 | 11/2022 | Anderson | |
| 2023/0229440 A1* | 7/2023 | Silavong .......... | G06F 16/90344 |
| | | | 717/123 |

FOREIGN PATENT DOCUMENTS

| | | | | | |
|---|---|---|---|---|---|
| CN | 112685739 A | * | 4/2021 | | |
| EP | 3992838 A1 | * | 5/2022 | ............. | G06F 40/58 |
| KR | 102411383 B1 | * | 6/2022 | ............. | G06F 21/56 |
| WO | WO-2020145892 A1 | * | 7/2020 | ............... | G06F 8/74 |

OTHER PUBLICATIONS

Das et al., "Network Intrusion Detection using Natural Language Processing and Ensemble Machine Learning," 2020 IEEE Symposium Series on Computational Intelligence (SSCI), Canberra, ACT, Australia, 2020, pp. 829-835, doi: 10.1109/SSCI47803.2020. 9308268. (Year: 2020).*

Xu et al., "CrossLMD: Cross-Language Malicious code Detection," 2023 IEEE Smart World Congress (SWC), Portsmouth, United Kingdom, 2023, pp. 1-8, doi: 10.1109/SWC57546.2023.10449012. (Year: 2023).*

Zong et al., "On Application of Natural Language Processing in Machine Translation," 2018 3rd International Conference on Mechanical, Control and Computer Engineering (ICMCCE), Huhhot, China, 2018, pp. 506-510, doi: 10.1109/ICMCCE.2018.00112. (Year: 2018).*

Jiang et al., "Natural Language Processing and Its Applications in Machine Translation: A Diachronic Review," 2020 IEEE 3rd International Conference of Safe Production and Informatization (IICSPI), Chongqing City, China, 2020, pp. 210-214, doi: 10.1109/IICSPI51290. 2020.9332458. (Year: 2020).*

Gao et al., "A Multi-Module Based Method for Generating Natural Language Descriptions of Code Fragments," in IEEE Access, vol. 9, pp. 21579-21592, 2021, doi: 10.1109/ACCESS.2021.3055955. (Year: 2021).*

Mohamed, "A Comprehensive Review of Natural Language Processing Techniques for Malware Detection, " 2024 15th International Conference on Computing Communication and Networking Technologies (ICCCNT), Kamand, India, 2024, pp. 1-7, doi: 10.1109/ ICCCNT61001.2024.10724079. (Year: 2024).*

Abbas et al., "IoT Malware Detection Technique Based on Deep Learning and Natural Language Processing," 2023 3rd International Conference on Electronic and Electrical Engineering and Intelligent System (ICE3IS), Yogyakarta, Indonesia, 2023, pp. 25-30, doi: 10.1109/ICE3IS59323.2023.10335306. (Year: 2023).*

Jamadi et al., "Enhanced Malware Prediction and Containment Using Bayesian Neural Networks," in IEEE Journal of Radio Frequency Identification, vol. 8, pp. 592-600, 2024, doi: 10.1109/ JRFID.2024.3410881. (Year: 2024).*

Gao et al., "Utilizing benign files to obfuscate malware via deep reinforcement learning," 2022 4th International Conference on Intelligent Information Processing (IIP), Guangzhou, China, 2022, pp. 293-297, doi: 10.1109/IIP57348.2022.00067. (Year: 2022).*

International Search Report Received in PCT Application No. PCT/US2024/013638, mailed on Nov. 20, 2024, 14 pages.

* cited by examiner

100

NEFARIOUS CODE DETECTION USING SEMANTIC UNDERSTANDING

CROSS-REFERENCE TO RELATED APPLICATION(S)

This application claims priority to U.S. Provisional Pat. App. No. 63/444,627, filed Feb. 10, 2023, entitled "NEFARIOUS CODE DETECTION USING SEMANTIC UNDERSTANDING". The entirety of this aforementioned application is incorporated herein by reference.

BACKGROUND

With cyber security threats evolving by the day, massive amounts of data being produced by consumers, and companies moving off-premises and into the cloud, typically there is an exponential increase in attack vectors that humans and reactive tools are unable to keep up with. As a result, typically there is an overall decrease in security for various systems and data.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to nefarious code detection using semantic understanding, as follows according to some examples. A natural-language output is generated by performing a natural-language translation of code. A machine-learning model is used to generate a confidence score that indicates a confidence that the natural-language output is potentially malicious. Based at least in part on whether the confidence score exceeds a first threshold, whether the natural-language output is potentially malicious is determined. Responsive to determining that the natural-language output potentially malicious, the code is flagged as potentially malicious.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Briefly stated, the disclosed technology is generally directed to nefarious code detection using semantic understanding, as follows according to some examples. A natural-language output is generated by performing a natural-language translation of code. A machine-learning model is used to generate a confidence score that indicates a confidence that the natural-language output is potentially malicious. Based at least in part on whether the confidence score exceeds a first threshold, whether the natural-language output is potentially malicious is determined. Responsive to determining that the natural-language output potentially malicious, the code is flagged as potentially malicious.

Illustrative Systems

Figure 1:
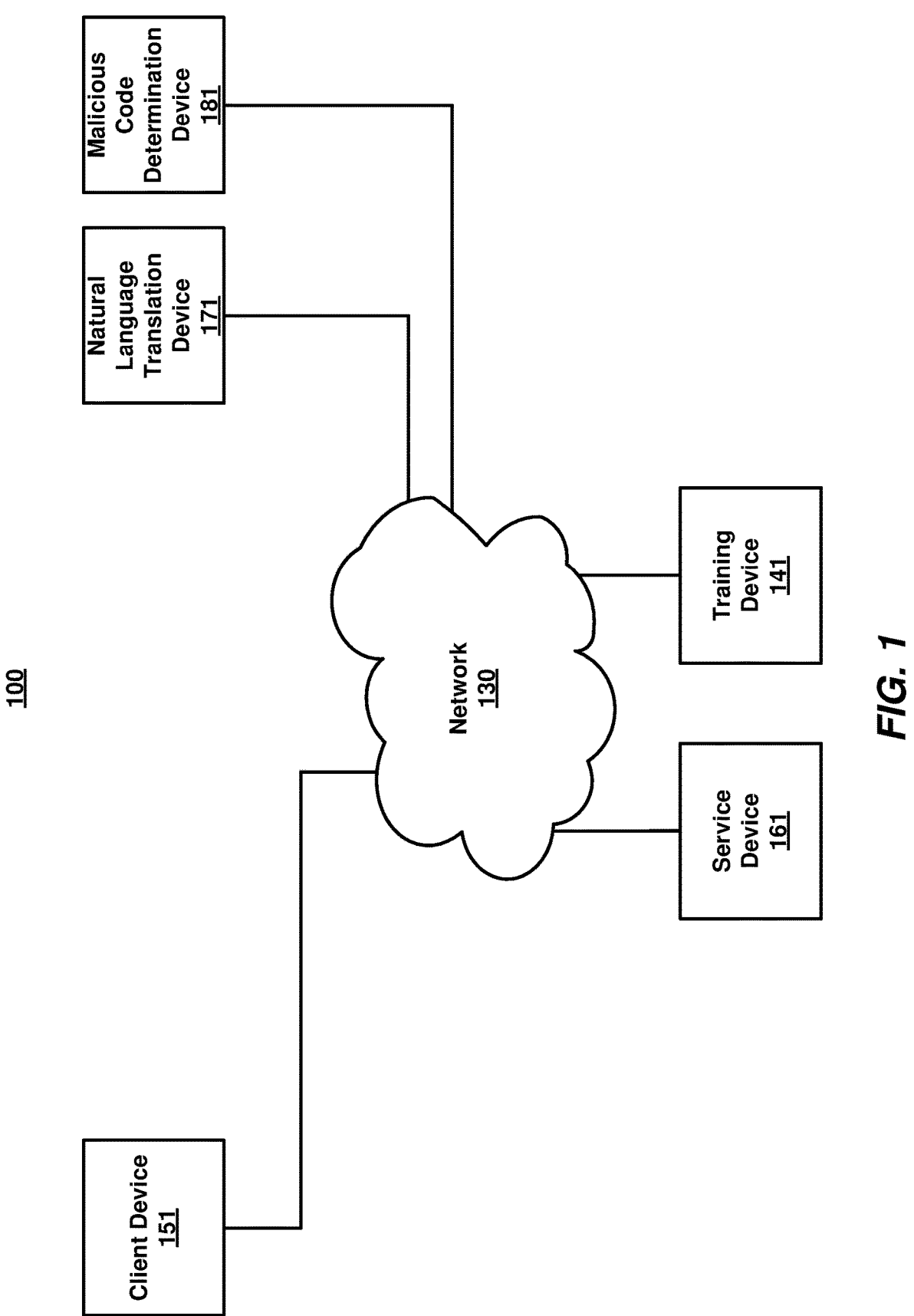
FIG. 1 is a block diagram illustrating an example of a network-connected system.

FIG. 1 is a block diagram illustrating an example of a system (100). FIG. 1 and the corresponding description of FIG. 1 in the specification illustrate an example system for illustrative purposes that does not limit the scope of the disclosure. System 100 is described as follows in accordance with some examples. System 100 includes network 130, as well as client device 151, service device 161, natural language translation device 171, malicious code determination device 181, and training device 141, which all connect to network 130. System 100 operates as follows in some examples.

Figure 5:
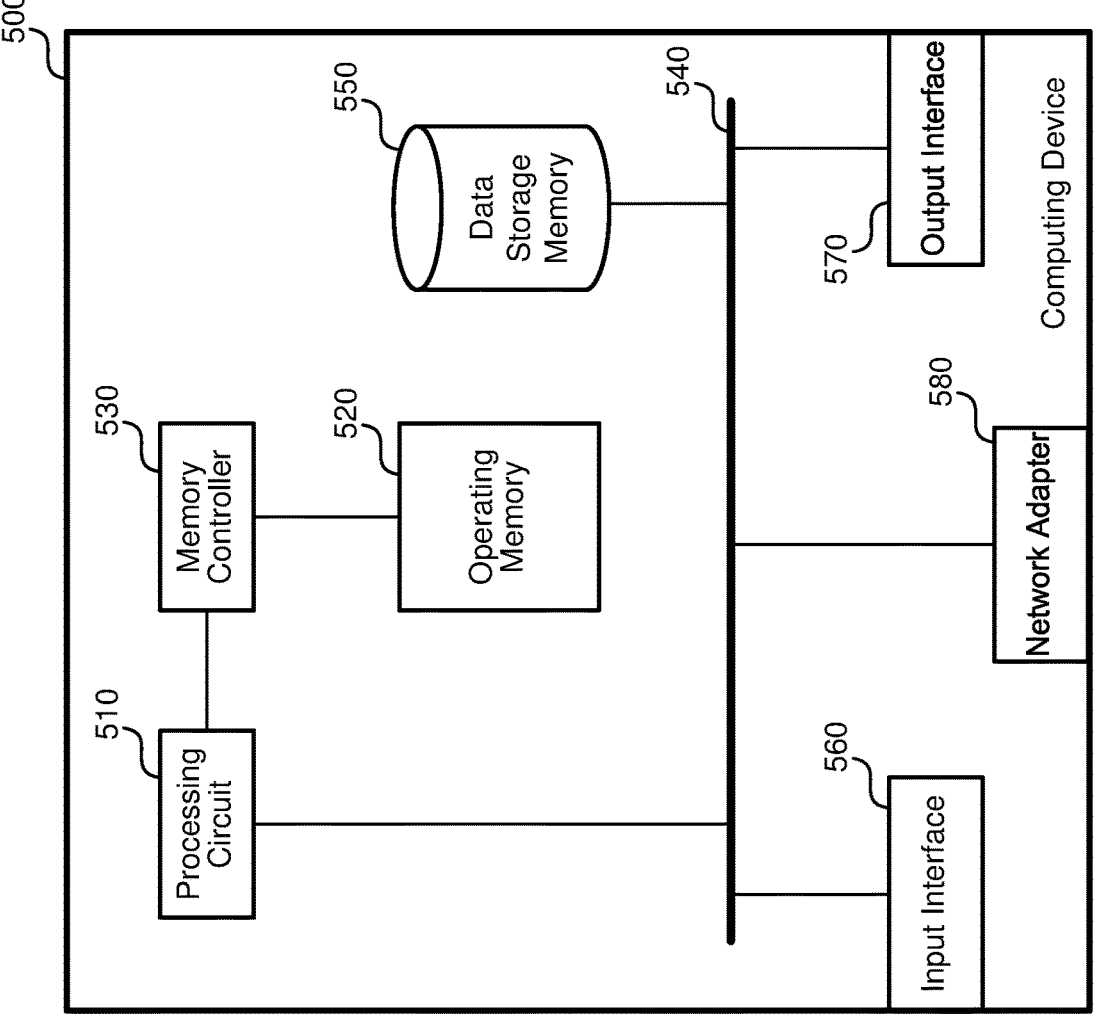
FIG. 5 is a block diagram illustrating one example of a suitable computing device, according to aspects of the disclosed technology.

Each of client device 151, service device 161, natural language translation device 171, malicious code determination device 181, and training device 141 includes an example of computing device 500 of FIG. 5. Some or all of client device 151, service device 161, natural language translation device 171, malicious code determination device 181, and training device 141 may be part of one or more distributed systems.

Service device 161 is part of a service that is provided on behalf of clients. Each client may communicate with the service via one or more devices, such as client device 151. Natural language translation device 171, malicious code determination device 181, and training device 141 may be part of the service or may be used by service device 161 in conjunction with the service. Natural language translation device 171, malicious code determination device 181, and training device 141 are used to provide the detection of malicious code on behalf of client device 151 or service device 161. Natural language translation device 171, malicious code determination device 181, and training device 141 are capable of identifying code as potentially malicious, including code that would not be identified as potentially malicious by existing malware detection.

Natural language translation device 171 translates code into natural language. Malicious code determination device 181 uses a machine-learning model to determine, based on the natural language, whether the corresponding code is potentially malicious. Training device 141 performs training of one or more models used by natural language translation device 171 or malicious code determination device 181.

Network 130 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, and/or other communications links known to those skilled in the art. Furthermore, remote computers and other related electronic devices could be remotely connected to either LANs or WANs via a modem and temporary telephone link. Network 130 may include various other networks such as one or more networks using local network protocols such as 6LoWPAN, ZigBee, or the like. In essence, network 130 may include any suitable network-based communication method by which information may travel among client device 151, service device 161, natural language translation device 171, malicious code determination device 181, and training device 141. Although each device is shown connected as connected to network 130, that does not necessarily mean that each device communicates with each other device shown. In some examples, some devices shown only communicate with some other devices/services shown via one or more intermediary devices. Also, although network 130 is illustrated as one network, in some examples, network 130 may instead include multiple networks that may or may not be connected with each other, with some of the devices shown communicating with each other through one network of the multiple networks and other of the devices shown instead communicating with each other with a different network of the multiple networks.

System 100 may include more or less devices than illustrated in FIG. 1, which is shown by way of example only.

Figure 2:
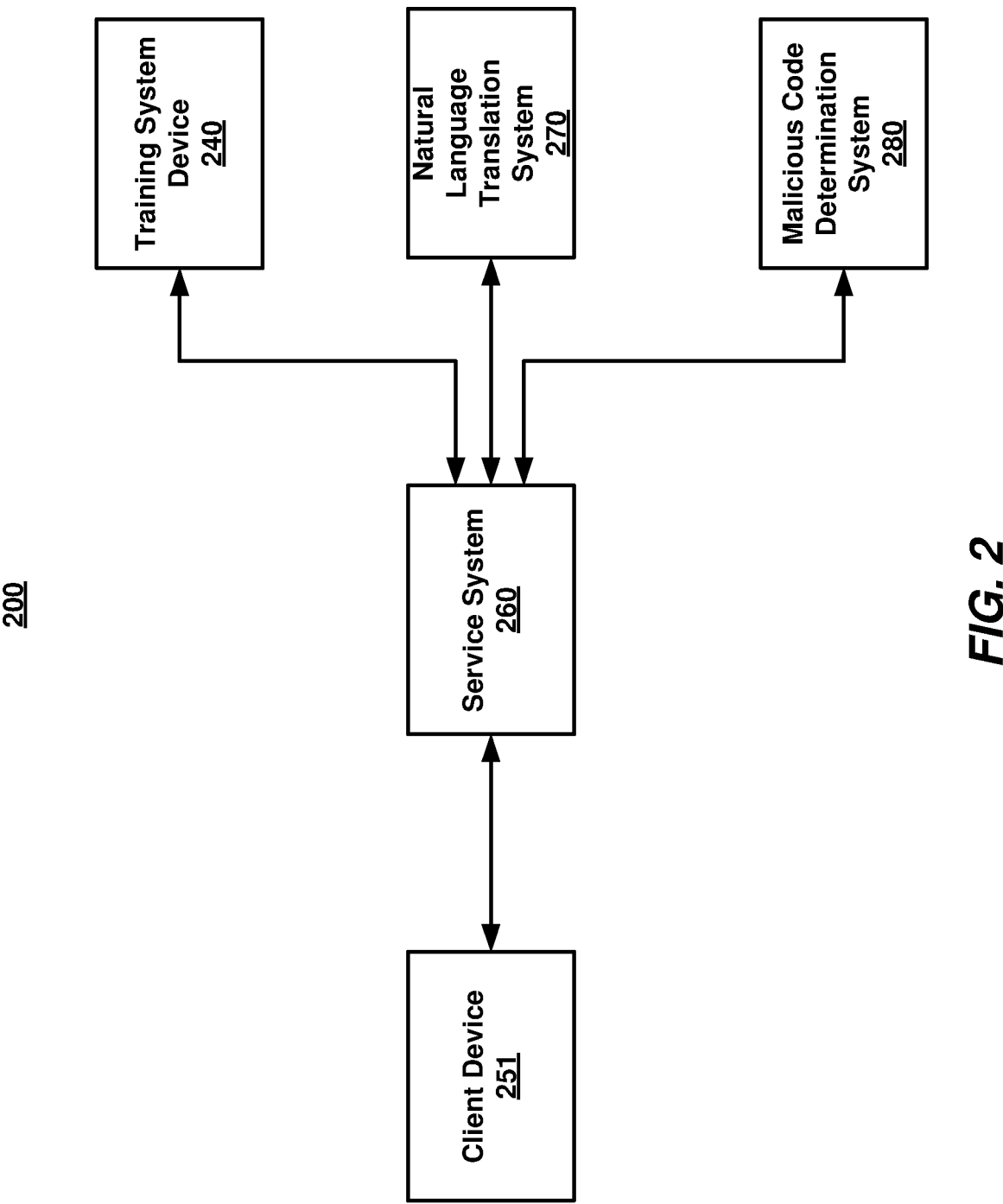
FIG. 2 is a block diagram illustrating an example of a system for nefarious code detection using semantic understanding.

FIG. 2 is a block diagram illustrating an example of a system (200). System 200 may be an example of system 100 of FIG. 2. System 200 is described as follows in accordance with some examples. System 200 includes client device 251, service system 260, natural language translation system 270, malicious code determination system 280, and training system 240. Service system 260, natural language translation system 270, malicious code determination system 280, and training system 240 may each include one or more distributed systems. System 200 operates as follows in some examples.

Service system 260 provides a service on behalf of clients. Each client communicates with service system 260 via one or more devices, such as client device 251. Natural language translation system 270, malicious code determination system 280, and training system 240 are used to provide the detection of malicious code on behalf of client device 251 or service system 260. Natural language translation system 270, malicious code determination system 280, and training system 240 are capable of identifying code as potentially malicious, including code that would not be identified as potentially malicious by existing malware detection.

Natural language translation system 270 converts code to natural language. Natural language translation system 270 converts code to natural language in different ways in different examples. In some examples, natural language translation system 270 converts code to natural language using neural machine translation. For instance, some examples of natural language translation system 270 use a neutral-network-based machine-learning model to translate input code into natural language, where the natural language expresses, in natural language, what the code does. The natural language may be any natural language used by people, such as English or any other natural language used by people.

In some examples, natural language translation system 270 operates as follows. Natural language translation system 270 uses a simplified parser to map layers of abstraction present in the input code. Natural language translation system 270 then traverses back up the layers of abstraction to output a sequence. This sequence is then input to the machine-learning model, where the machine-learning model outputs the natural-language translation of the input code.

In other examples, the input code is provided directly to the machine-learning model, rather than first performing simplified parsing on the input code.

The machine-learning model is trained by training system 240. Training system 240 trains the machine-learning model based on supervised, semi-supervised, or unsupervised training of a neural-network-based system so that the machine-learning model is capable of translating input code into natural language.

In other examples, rather than using a neural-machine-translation-based approach, natural language translation system 270 uses a Parsing Expression Grammar (PEG) Parser to convert the input code into a natural-language translation of the input code. Some examples of natural language translation system 270 that use a PEG Parser to convert the input code into a natural-language translation of the input code operate as follows. Natural language translation system 270 uses a reverse complier for the programming language of the input code. The PEG parser includes an infinite lookahead buffer to intake large input sequences. The PEG parser moves through a recursive structure that includes numerous layers of abstraction in the input code. Once the lowest level of abstraction in the input code is reached, memoization is used to efficiently conduct translation back up the recursive structure of the input code. (Memoization is an optimization technique that stores the results of expensive function calls and returns the cached result when the same inputs occur again.) For instance, in some examples, the efficient translation back up the recursive structure of the input code is accomplished using packrat parsing. Packrat parsing is a type of PEG Parsing technique that caches whether sub-expressions match at the current position in the string when they are tested.

Malicious code determination system 280 uses a machine-learning model to determine, based on the natural-language translation of the input code, whether the corresponding input code is potentially malicious. The machine-learning model is trained by training system 240. Malicious code determination system 280 uses machine learning to determine, based on the natural-language translation of the input code, whether the corresponding input code is potentially malicious in different ways in different examples, such as using a binary classification approach, using a semantic language comparison approach, using a natural-language generation approach, or in another suitable manner. If malicious code determination system 280 identifies the input code to be potentially malicious, service system 251 causes the input code to be flagged.

In some examples, the machine-learning model used by malicious code determination system 280 uses a binary classification approach. Some examples of malicious code determination system 280 that use a binary classification approach operate as follows in some examples. The machine-learning model used by malicious code determination system 280 is trained using data sets that contain labeled pairs of potentially malicious code sequences. The datasets also include non-malicious code examples. The training uses a ground truth that indicates, for each code sequence example, whether the code sequence is malicious or non-malicious, and, if the code sequence is malicious, indicates the intended action or the attack sequence that the code sequence is using. The training may be used to fine-tune a classification algorithm or machine-learning model for binary classification on the natural-language translation to output a probabilistic score indicating the predicted probability that the corresponding code is malicious. For instance, the training may be used to fine-tune a classification algorithm or machine-learning model such as Naïve Bayes or Bidirectional Encoder Representation from Transformers (BERT). In these examples, in operation, malicious code determination system 280 uses the classification algorithm or machine-learning model on the natural-language translation to generate a probabilistic score indicating the predicted probability that the corresponding code is malicious. Malicious code determination system 280 then determines whether the code is potentially malicious by comparing the probabilistic score to a threshold score.

In some examples, the training data used is not limited cyber security contexts. For instance, the training data may further include a more general context of behavior, intent, or the like that may be considered malicious, nefarious, or otherwise harmful. The training data may include both harmful and harmless examples that are outside of the cyber security context. In this way, malicious code determination system 280 may avoid hyper-focusing, and be capable of identifying code as potentially malicious even if the code is not currently identified as malware by conventional malware detection, if the code performs actions that may be bad, that may be based on bad intent, or that may have a harmful effect regardless of intent. In this case, it is more beneficial to alert on potentially harmful code so that a human-in-the-loop can further investigate surrounding circumstances such as the intended user and code environment to make an informed decision as to whether there is malicious intent or malicious effect.

In some examples, the machine-learning model used by malicious code determination system 280 uses semantic language comparison. Examples of malicious code determination system 280 that use semantic language comparison to determine, based on the natural-language translation, whether the corresponding input code is potentially malicious, do so in different suitable ways in different examples.

For instance, some examples of malicious code determination system 280 that use semantic language comparison operate as follows in some examples. In some examples, malicious code determination system 280 uses a machine-learning model to gain a semantic understanding of the intent of the corresponding input code, and to then determine whether the intent is malicious. For example, the machine-learning model may determine the action or actions being performed by the code, and then based on semantic analysis of that action or actions, determine whether that action or actions may have malicious intent.

Some examples of malicious code determination system 280 that use semantic language comparison instead operate as follows in some examples. Malicious code determination system 280 performs sentiment analysis, semantic understanding, or the like on the natural-language code translation. Based on the determined semantic meaning of the natural language, such as a semantic understanding of the intent of the natural language, malicious code determination system 280 generates a score that indicates the degree of confidence that the determined intent of the natural language is malicious. Malicious code determination system 280 then determines whether the code is potentially malicious by comparing the score to a threshold score.

For instance, in some examples, malicious code determination system 280 compares the semantic intent of the natural-language code translation to detailed documentation and descriptions of cyber adversary techniques and how they are performed. For instance, in some examples, the semantic intent of the natural-language code translation to detailed documentation and descriptions of cyber adversary techniques and how they are performed using the MITRE Attack® framework as a knowledge base for adversary tactics and techniques. The semantic language comparison will return a score from zero to one that indicates the degree of similarity between the code translation and sections of the documentation.

Malicious code determination system 280 uses a sentence transformer model to provide vectors and map both the natural-language code translation and adversary attack documentation to a dense vector space. The vectors are vectors of floating points numbers that represent features used for semantic analysis the machine-learning model. By comparing the vectors from the code translation to the vectors produced from the documentation, malicious code determination system 280 performs a semantic comparison of the intent of the code used to the descriptions of the threat techniques. If there is a notable score of semantic similarity between the code translation and section(s) of the documentation based on the semantic comparison, the corresponding input code is identified as potentially malicious. The semantic analysis takes into account the intent of the words according to their context. Accordingly, exact matching keywords between the code translation and the documentation do not need to exist in order for there to be a high similarity. In this way, the meaning of the translation, rather than the variations in how code is translated to different words, is the basis of the determination as to whether the corresponding input code is potentially malicious.

In some examples, the machine-learning model used by malicious code determination system 280 uses a natural-language generation approach. Examples of malicious code determination system 280 that use a natural-language generation approach do so in different suitable ways in different examples.

For instance, some examples of malicious code determination system 280 that use a natural-language generation approach operate as follows in some examples. Rather than translating the input code into a natural-language generation one time, multiple variations of the translation of the input code into natural language are performed. Generative Pre-trained Transformer models can be used to generate translations relevant to the code snippets. One example of a Generative Pre-trained Transformer model that may be used is OpenAI's Davinci model. By generating multiple iterations of translations performed by the model, a more robust corpus of translations can be used to gain a lower bias and a more accurate comparison. Malicious code determination system 280 then uses semantic language comparison on each of these variations to determine whether that variation of the natural-language translation of the input code is potentially malicious. Malicious code determination system 280 then determines whether the code is potentially malicious based on the semantic language comparison performed on each of the variations. A confidence score may be determined separately for each translation or a composite confidence score may be determined based on the semantic language translation result from the semantic language comparison performed on each of the variations.

As discussed above, in some examples of system 200, a machine-learning model is used to generate a confidence score that indicates a confidence that the natural-language output is potentially malicious, a determination is made as to whether the natural-language output is potentially malicious based, at least in part, on whether the confidence score exceeds a particular threshold, and if the natural-language output is determined to be potentially malicious, the input code is flagged as potentially malicious. For instance, as discussed above, in some examples, the machine-learning model used by malicious code determination system 280 uses a binary classification approach, and the confidence score is a probabilistic score that is compared to a threshold score. In some examples, the machine-learning model used by malicious code determination system 280 uses semantic language comparison, the confidence core is a score that indicates the degree of confidence that the determined intent of the natural language is malicious, and that score is compared to a threshold score. In some examples, the machine-learning model used by malicious code determination system 280 uses a natural-language generation approach in which multiple variations of the translation of the input code into natural language are performed, and semantic language comparison is used on each of these variations to generate, for each variation, a score that indicates the degree of confidence that the determined intent of that variation is malicious. In these examples, the determination as to whether the input code is potentially malicious is based on a determination, for each of the variations, whether the score for that variation reaches a threshold, based on whether a composite score based on all of the variations reaches a threshold, or the like.

As discussed above, if malicious code determination system 280 identifies the input code to be potentially malicious, service system 251 causes the input code to be flagged. Code that is flagged as potentially malicious by service system 251 can be subject to further analysis or review to determine whether the code is actually malicious and, if so, also subject to further actions to deal with the malicious code. System 200 is capable of detecting code that has not been classified as malware (by conventional malware detection) as being potentially nefarious, and accordingly such code may be flagged for further analysis and review rather than attempting to deal with the code in an automated manner. Accordingly, in some examples, some code that is not classified as malware is nefarious and is flagged as potentially malicious by system 200.

Rather than identifying malware by comparing samples to templatized "fingerprints" and "signatures" of known malware, examples of system 200 detect potentially malicious code by first translating the code in natural language, which allows system 200 to determine whether code is potentially malicious by inferred intent based on the natural language. This may enable system 200 to identify hacks, intrusions, and vulnerabilities that are exploited by code that does not fit the fingerprint of code that is classified as malware by conventional malware detection. Among other things, this enables system 200 to identify malicious code for which there is no pre-existing "dictionary" or reference to prior examples of the malicious code. System 200 is capable of identifying malicious code while not starting with any baseline understanding of what code is malicious or not malicious.

For example, code that searches domain user properties for easily recognizable passwords may be flagged by system

200 as potentially malicious. Templatized code would not recognize this code as malware because a generic domain user on a computer system does not have a password property. However, code that is searching for easily recognizable passwords, even if searching a generic user domain, may have a malicious intent of guessing a user's password in order to hack into the user's system, and would therefore be flagged by system 200 as potentially malicious. System 200 translates the code into a natural language that indicates that the code searches domain user properties for easily recognizable passwords. System 200 then determines whether the natural-language translation indicates that the corresponding code is potentially malicious, such as by performing a natural-language task of sentiment analysis to determine whether the action is malicious or not. System 200 determines that this action is potentially malicious because it could be performed by a hacker that is looking for passwords.

As another example, system 200 may determine that code that writes to a system file /etc/passwd, in which user passwords are kept in a Unix-like system, may be malicious because it is writing to the system file /etc/passwd, which could potentially be used to gain access to the system as root. Such code would not be identified as malicious by conventional malware detection.

Illustrative Processes

Figure 3:
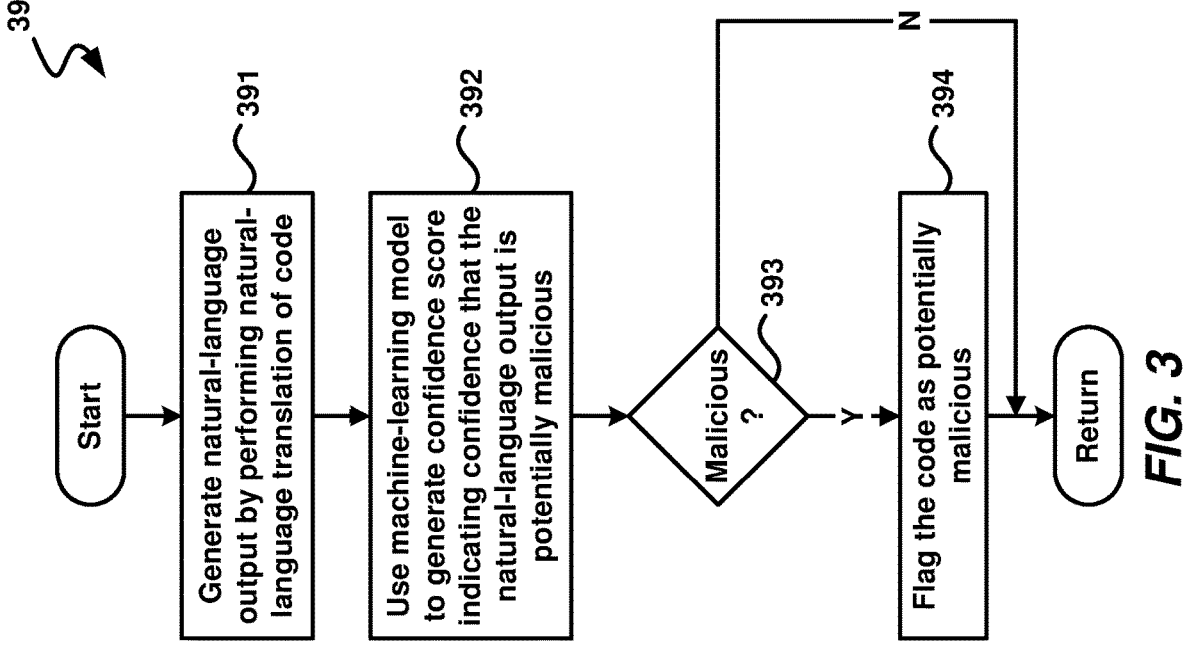
FIG. 3 is a flow diagram illustrating an example process for nefarious code detection using semantic understanding.

FIG. 3 is a diagram illustrating an example dataflow for a process (390) for nefarious code detection using semantic understanding. In some examples, process 390 proceeds as follows.

Step 391 occurs first. At step 391, a natural-language output is generated by performing a natural-language translation of code. As shown, step 392 occurs next. At step 392, a machine-learning model is used to generate a confidence score that indicates a confidence that the natural-language output is potentially malicious. As shown, the process then proceeds to decision block 393. At decision block 393, based at least in part on whether the confidence score exceeds a first threshold, a determination is made as to whether the natural-language output is potentially malicious is determined. If not, the process proceeds to a return block, where other processing is resumed. If, however, instead the determination at decision block 393 is positive, step 394 occurs next. At step 394, responsive to determining that the natural-language output potentially malicious, the code is flagged as potentially malicious. The process may then advance to the return block.

Illustrative Devices/Operating Environments

Figure 4:
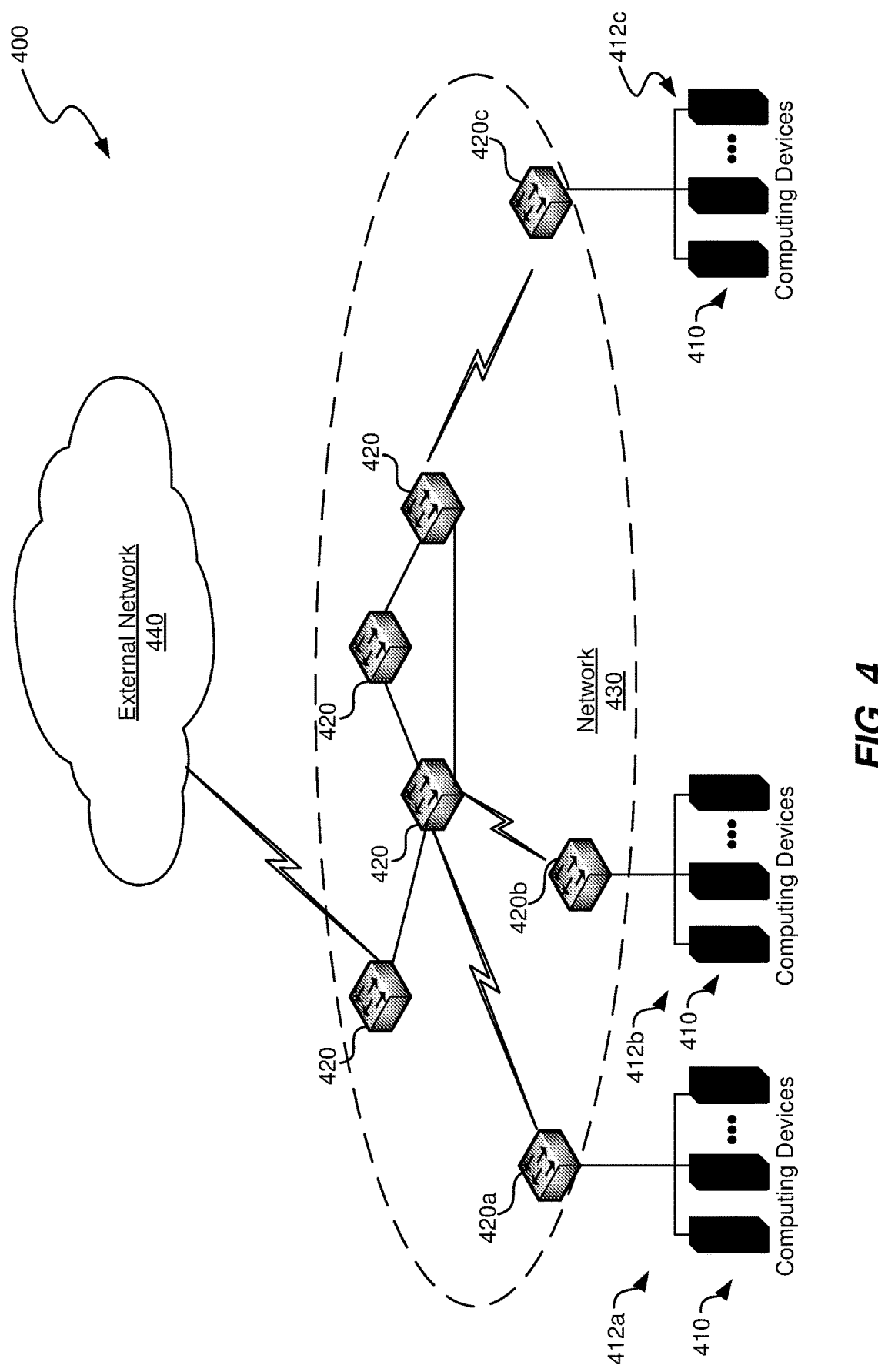
FIG. 4 is a block diagram illustrating one example of a suitable environment in which aspects of the technology may be employed.

FIG. 4 is a diagram of environment 400 in which aspects of the technology may be practiced. As shown, environment 400 includes computing devices 410, as well as network nodes 420, connected via network 430. Even though particular components of environment 400 are shown in FIG. 4, in other examples, environment 400 can also include additional and/or different components. For example, in certain examples, the environment 400 can also include network storage devices, maintenance managers, and/or other suitable components (not shown). Computing devices 410 shown in FIG. 4 may be in various locations, including a local computer, on premise, in the cloud, or the like. For example, computer devices 410 may be on the client side, on the server side, or the like.

As shown in FIG. 4, network 430 can include one or more network nodes 420 that interconnect multiple computing devices 410, and connect computing devices 410 to external network 440, e.g., the Internet or an intranet. For example, network nodes 420 may include switches, routers, hubs, network controllers, or other network elements. In certain examples, computing devices 410 can be organized into racks, action zones, groups, sets, or other suitable divisions. For example, in the illustrated example, computing devices 410 are grouped into three host sets identified individually as first, second, and third host sets 412a-112c. In the illustrated example, each of host sets 412a-112c is operatively coupled to a corresponding network node 420a-120c, respectively, which are commonly referred to as "top-of-rack" or "TOR" network nodes. TOR network nodes 420a-120c can then be operatively coupled to additional network nodes 420 to form a computer network in a hierarchical, flat, mesh, or other suitable types of topology that allows communications between computing devices 410 and external network 440. In other examples, multiple host sets 412a-112c may share a single network node 420. Computing devices 410 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 410 may be individually configured to provide computing, storage, and/ or other suitable computing services.

In some examples, one or more of the computing devices 410 is a device that is configured to be at least part of a system for nefarious code detection using semantic understanding.

Illustrative Computing Device

FIG. 5 is a diagram illustrating one example of computing device 500 in which aspects of the technology may be practiced. Computing device 500 may be virtually any type of general- or specific-purpose computing device. For example, computing device 500 may be a user device such as a desktop computer, a laptop computer, a tablet computer, a display device, a camera, a printer, or a smartphone. Likewise, computing device 500 may also be a server device such as an application server computer, a virtual computing host computer, or a file server computer, e.g., computing device 500 may be an example of computing device 410 or network node 420 of FIG. 4. Likewise, computer device 500 may be an example any of the devices, a device within any of the distributed systems, illustrated in or referred to in any of the above figures, as discussed in greater detail above and below. As illustrated in FIG. 5, computing device 500 may include processing circuit 510, operating memory 520, memory controller 530, bus 540, data storage memory 550, input interface 560, output interface 570, and network adapter 580. Each of these afore-listed components of computing device 500 includes at least one hardware element.

Computing device 500 includes at least one processing circuit 510 configured to execute instructions, such as instructions for implementing the herein-described workloads, processes, and/or technology. Processing circuit 510 may include a microprocessor, a microcontroller, a graphics processor, a coprocessor, a field-programmable gate array, a programmable logic device, a signal processor, and/or any other circuit suitable for processing data. The aforementioned instructions, along with other data (e.g., datasets, metadata, operating system instructions, etc.), may be stored in operating memory 520 during run-time of computing device 500. Operating memory 520 may also include any of a variety of data storage devices/components, such as volatile memories, semi-volatile memories, random access memories, static memories, caches, buffers, and/or other media used to store run-time information. In one example, operating memory 520 does not retain information when computing device 500 is powered off. Rather, computing device 500 may be configured to transfer instructions from a non-volatile data storage component (e.g., data storage component 550) to operating memory 520 as part of a booting or other loading process. In some examples, other forms of execution may be employed, such as execution directly from data storage component 550, e.g., eXecute In Place (XIP).

Operating memory 520 may include 4$^{th}$ generation double data rate (DDR4) memory, 3$^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), and/or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 510 via memory controller 530 in channels. One example of computing device 500 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 520 specifically does not include or encompass communications media, any communications medium, or any signals per se.

Memory controller 530 is configured to interface processing circuit 510 to operating memory 520. For example, memory controller 530 may be configured to interface commands, addresses, and data between operating memory 520 and processing circuit 510. Memory controller 530 may also be configured to abstract or otherwise manage certain aspects of memory management from or for processing circuit 510. Although memory controller 530 is illustrated as single memory controller separate from processing circuit 510, in other examples, multiple memory controllers may be employed, memory controller(s) may be integrated with operating memory 520, and/or the like. Further, memory controller(s) may be integrated into processing circuit 510. These and other variations are possible.

In computing device 500, data storage memory 550, input interface 560, output interface 570, and network adapter 580 are interfaced to processing circuit 510 by bus 540. Although FIG. 5 illustrates bus 540 as a single passive bus, other configurations, such as a collection of buses, a collection of point-to-point links, an input/output controller, a bridge, other interface circuitry, and/or any collection thereof may also be suitably employed for interfacing data storage memory 550, input interface 560, output interface 570, and/or network adapter 580 to processing circuit 510.

In computing device 500, data storage memory 550 is employed for long-term non-volatile data storage. Data storage memory 550 may include any of a variety of non-volatile data storage devices/components, such as non-volatile memories, disks, disk drives, hard drives, solid-state drives, and/or any other media that can be used for the non-volatile storage of information. However, data storage memory 550 specifically does not include or encompass communications media, any communications medium, or any signals per se. In contrast to operating memory 520, data storage memory 550 is employed by computing device 500 for non-volatile long-term data storage, instead of for runtime data storage.

Also, computing device 500 may include or be coupled to any type of processor-readable media such as processor-readable storage media (e.g., operating memory 520 and data storage memory 550) and communication media (e.g., communication signals and radio waves). While the term processor-readable storage media includes operating memory 520 and data storage memory 550, the term "processor-readable storage media," throughout the specification and the claims, whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 500 also includes input interface 560, which may be configured to enable computing device 500 to receive input from users or from other devices. In addition, computing device 500 includes output interface 570, which may be configured to provide output from computing device 500. In one example, output interface 570 includes a frame buffer, graphics processor, graphics processor or accelerator, and is configured to render displays for presentation on a separate visual display device (such as a monitor, projector, virtual computing client computer, etc.). In another example, output interface 570 includes a visual display device and is configured to render and present displays for viewing. In yet another example, input interface 560 and/or output interface 570 may include a universal asynchronous receiver/transmitter (UART), a Serial Peripheral Interface (SPI), Inter-Integrated Circuit (I2C), a General-purpose input/output (GPIO), and/or the like. Moreover, input interface 560 and/or output interface 570 may include or be interfaced to any number or type of peripherals.

In the illustrated example, computing device 500 is configured to communicate with other computing devices or entities via network adapter 580. Network adapter 580 may include a wired network adapter, e.g., an Ethernet adapter, a Token Ring adapter, or a Digital Subscriber Line (DSL) adapter. Network adapter 580 may also include a wireless network adapter, for example, a Wi-Fi adapter, a Bluetooth adapter, a ZigBee adapter, a Long-Term Evolution (LTE) adapter, SigFox, LoRa, Powerline, or a 5G adapter.

Although computing device 500 is illustrated with certain components configured in a particular arrangement, these components and arrangements are merely one example of a computing device in which the technology may be employed. In other examples, data storage memory 550, input interface 560, output interface 570, or network adapter 580 may be directly coupled to processing circuit 510 or be coupled to processing circuit 510 via an input/output controller, a bridge, or other interface circuitry. Other variations of the technology are possible.

Some examples of computing device 500 include at least one memory (e.g., operating memory 520) having processor-executable code stored therein, and at least one processor (e.g., processing unit 510) that is adapted to execute the processor-executable code, wherein the processor-executable code includes processor-executable instructions that, in response to execution, enables computing device 500 to perform actions, where the actions may include, in some examples, actions for one or more processes described herein, such as the process shown in FIG. 3, as discussed in greater detail above.

The above description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on," and includes the option of being based on additional factors, some of which may not be described herein. As another example, the term "via" is not exclusive, and is equivalent to the term "via, at least in part," and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "cloud" or "cloud computing" refers to shared pools of configurable computer system resources and higher-level services over a wide-area network, typically the Internet. "Edge" devices refer to devices that are not themselves part of the cloud but are devices that serve as an entry point into enterprise or service provider core networks.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
a device including at least one memory having processor-executable code stored therein, and at least one processor that is adapted to execute the processor-executable code, wherein the processor-executable code includes processor-executable instructions that, in response to execution, enable the device to perform actions, including:
generating a natural-language output using a parser to traverse a plurality of abstraction layers of code and output a sequence representing the plurality of abstraction layers;
using a machine-learning model to generate a confidence score that indicates a confidence that the natural-language output is potentially malicious, wherein the natural-language output includes two or more different variations of a natural-language translation of the code, and wherein generating the confidence score for the natural-language output includes generating corresponding variant confidence scores for each of the two or more different variations, and wherein the confidence score is a composite score generated based on the corresponding variant confidence scores for each of the two or more different variations;
based at least in part on whether the confidence score exceeds a first threshold, determining whether the natural-language output is potentially malicious; and
responsive to determining that the natural-language output is potentially malicious, flagging the code as potentially malicious.

2. The apparatus of claim 1, wherein the machine-learning model generates the confidence score based on at least one of a binary classification approach, a semantic language comparison approach, or a natural-language generation approach.

3. The apparatus of claim 1, wherein the code is not classified as malware and the natural-language output is determined to be potentially malicious.

4. The apparatus of claim 1, wherein generating the confidence score includes applying a binary classification model to the natural-language output.

5. The apparatus of claim 4, wherein the binary classification model is a model that is fine-tuned using at least one of Naïve Bayes or Bidirectional Encoder Representation from Transformers.

6. The apparatus of claim 1, wherein generating the confidence score includes performing semantic language comparison on the natural-language output.

7. The apparatus of claim 6, wherein performing semantic language comparison on the natural-language output is accomplished by converting the natural-language output into a vector and using the vector to perform a semantic comparison of an intent of the code to determine a confidence that the intent of the code is potentially malicious.

8. A method, comprising:
generating a natural-language output using a parser to traverse a plurality of abstraction layers of code and output a sequence representing the plurality of abstraction layers;
via at least one processor, using a machine-learning model to determine whether the natural-language output is potentially malicious by generating a confidence score that indicates a confidence that the natural-language output is potentially malicious, wherein the natural-language output includes two or more different variations of a natural-language translation of the code, wherein generating the confidence score for the natural-language output includes generating corresponding variant confidence scores for each of the two or more different variations, and wherein the confidence score is a composite score generated based on the corresponding variant confidence scores for each of the two or more different variations; and
if the natural-language output is determined to be potentially malicious, flagging the code as potentially malicious.

9. The method of claim 8, wherein using the machine-learning model to determine whether the natural-language output is potentially malicious includes:
using the machine-learning model to gain a semantic understanding of an intent that is associated with the natural-language output;
based on the semantic understanding of the intent, generating the confidence score; and
determining whether the natural-language output is potentially malicious based on a determination as to whether the confidence score exceeds a threshold.

10. The method of claim 8, wherein using the machine-learning model to determine whether the natural-language output is potentially malicious includes: applying a binary classification model to the natural-language output.

11. The method of claim 8, wherein using the machine-learning model to determine whether the natural-language output is potentially malicious includes: performing semantic language comparison on the natural-language output.

12. The method of claim 11, wherein performing semantic language comparison on the natural-language output includes converting the natural-language output into a vector and using the vector to perform a semantic comparison of an intent of the code to determine whether the natural-language output is potentially malicious.

13. A processor-readable storage medium, having stored thereon processor-executable code that, upon execution by at least one processor, enables actions, comprising:
performing a natural-language translation of code to generate a natural-language output using a parser to traverse a plurality of abstraction layers of code and output a sequence representing the plurality of abstraction layers;
evaluating, via a machine-learning model, a confidence score that indicates a confidence that the natural-language output is potentially malicious, wherein the natural-language output includes two or more different variations of the natural-language translation of the code, and wherein generating the confidence score for the natural-language output includes generating corresponding variant confidence scores for each of the two or more different variations, and wherein the confidence score is a composite score generated based on the corresponding variant confidence scores for each of the two or more different variations;

determining whether the natural-language output is potentially malicious based at least in part on whether the confidence score exceeds a first threshold; and flagging the code as potentially malicious upon determining that the natural-language output is potentially malicious.

14. The processor-readable storage medium of claim 13, wherein evaluating the confidence score includes applying a binary classification model to the natural-language output.

15. The processor-readable storage medium of claim 13, wherein evaluating the confidence score includes performing semantic language comparison on the natural-language output.

16. The processor-readable storage medium of claim 15, wherein performing semantic language comparison on the natural-language output is accomplished by converting the natural-language output into a vector and using the vector to perform a semantic comparison of an intent of the code to determine a confidence that the intent of the code is potentially malicious.

* * * * *